United States Patent Office 3,493,558
Patented Feb. 3, 1970

3,493,558
PURIFICATION OF ADENOSINE TRIPHOSPHATE
Hirotoshi Samejima, Hiroshi Teranishi, Takashi Deguchi, and Kiyoshi Kumabe, Tokyo-to, and Teruo Hayashi and Masami Serizawa, Sunto-gun, Japan, assignors to Kyowa Hakko Kogyo Co., Ltd. (Kyowa Hakko Kogyo Kabushiki Kaisha), Tokyo-to, Japan, a body corporate of Japan
Filed May 8, 1967, Ser. No. 636,991
Claims priority, application Japan, May 13, 1966, 41/29,932
Int. Cl. C07d *51/50;* A61k *27/00*
U.S. Cl. 260—211.5                      19 Claims

ABSTRACT OF THE DISCLOSURE

The present invention relates to processes for purifying adenosine triphosphate (ATP) contained in aqueous solutions which also contain other nucleotides as impurity by the use of a series of ion exchange treatments. It provides advantages in purification obtained over prior art processes.

Background of invention

Throughout the specification and appendent claims the letters "ATP" are used to designate adenosine triphosphate, and it will be understood that they are intended to include adenosine triphosphate in salt form (e.g. as the disodium salt) whenever the context permits.

ATP is directly involved in the energy metabolism of living bodies and plays an important role in the contraction of muscles and biosynthesis of compositions in organisms. ATP is therefore useful as a medicant for example for the treatment of heat disease an dhte aftertreatment of apoplexy.

However, ATP of ordinary commercial grade has a toxicity (LD$_{50}$) of about 250 mg./kg. and can give rise to a temporary shock when administered intravenously to mice in a dose of 5 mg./kg. (hereinafter designated as the "shock dose"). In accordance with the present invention purified ATP haivng a LD$_{50}$ of about 510 mg./kg. and a shock dose of more than 10 mg./kg. may be obtained. Thus by using ATP purified in accordance with the present invention, it is possible safely to administer larger doses of ATP and thereby to increase the curative effect obtained. The process according to the invention can for example be carried out to effect a 50% reduction in toxicity, and thereby to double the size of the dose of ATP which can be administered.

In the prior art processes for the isolation and purification of ATP, various techniques using for example insoluble metallic salts, ion exchange chromatography, solvent extraction, adsorption with active charcoal and combinations of these techniques have been proposed. However, these known processes in general have disadvantages such as for example relatively low yield of purified product and relatively low purity and relatively high toxicity of the ATP obtained. It has proved difficult to develop a satisfactory process for the purification of ATP resulting in high purity and good yield.

In one previously proposed process using a strongly basic ion exchange resin, various nucleotides can indeed be separated from each other with good results. The fractions obtained containing the ATP are, however, in general very dilute and furthermore contain large amounts of inorganic salts as impurities. As a result, this process requires further operating steps to concentrate the ATP and/or to desalt the fractions obtained when operated on a commercial scale. It has been proposed to precipitate the ATP as a heavy metal salt or to adsorb it on to active carbon whence the ATP can be recovered by elution. However, the former method (the precipitation of ATP as a heavy metal salt) has disadvantages e.g. the possible coprecipitation of large amounts of impurities or the decomposition of ATP owing to the catalytic action of the heavy metals used. To prevent the danger of this the process must be carried out at relatively low temperatures. On the other hand, the latter method (the adsorption with active carbon) while adsorbing the ATP satisfactorily requires a large amount of an aqueous solvent for the subsequent elution of ATP from the active carbon. Additionally, this method has further disadvantages, e.g. poor yield based on starting materials and low selectivity for the ATP to be separated. Therefore, the method yields ATP having the level of toxicity which is characteristic of the ordinary commercial grades presently available.

Summary of invention

According to the present invention, there is provided a process for purifying ATP contained in an aqueous solution which also contains other nucleotides as impurity, which process comprises the steps of (1) adsorbing ATP on to a strongly basic anion exchange resin, such as polystyrene quarternary ammonium type basic anion exchange resin, followed by elution with an aqueous acid solution; (2) adsorbing the ATP on to a weakly basic anion exchange resin followed by elution with an aqueous dilute alkaline solution; and (3) contacting the ATP in aqueous solution with a non-ionic exchange decolorising resin whereby coloring matter is adsorbed thereon while the ATP remains in solution.

The process according to the present invention can advantageously be carried out without using hazardous operational conditions such as e.g. high temperatures. ATP can be obtained according to the present invention having various superior properties as compared with ATP obtained by conventional processes.

According to the present invention, an aqueous solution containing ATP is first passed through a strongly basic anion exchange resin (conveniently in the salt form) to adsorb the ATP together with various other nucleotides. Polystyrene quarternary ammonium type strongly basic anion exchange resin are especially preferred, such as Dowex 1 (product of Dow Chemical Company), Amberlite IRA 400 (produced by Rohm & Haas Company), and Diaion SA 21–A (product of Mitsubishi Kasei Kogyo K.K., Tokyo, Japan). The ATP adsorbed is then preferably eluted stepwise with aqueous eluant which has different and increasing concentrations of mineral acid and/or soluble salt and is recovered selectively in specific fractions. In the second step, the dilute ATP solution obtained from the first step is treated with a weakly basic anion exchange resin, especially ones having primary, secondary and/or tertiary amine groups, which is advantageously porous and in salt form to adsorb the ATP.

While illustrative resins of this type, such as polystyrene-divinyl benzene copolymers having primary, secondary and/or tertiary amine groups can be employed, copolymers of phenol (or an aromatic amine such as meta phenylenediamine), and an aliphatic amine such as diethylene-triamine, and formaldehyde are preferred, since the latter type is usually more porous than the former. Exemplifying the preferred second type of resin is Duolite A–2 and A–7 (products of the Dow Chemical Company). An especially preferred weakly basic anion exchange resin is of the phenol-aliphatic amine type.

The ATP is then preferably eluted with a dilute aqueous solution of caustic soda whereby impurities responsible for toxicity are removed and a concentrated solution of ATP is obtained. In the third step, the ATP solution obtained from the second step is conveniently adjusted to a pH of 1.0–5.0, preferably 2.0 to 4.0, and is passed through a non-ion exchange decolorizing resin to absorb coloring matter (and additional residual toxic substances). The purified ATP can be recovered from the effluent.

The ATP solution (disodium salt) obtained by the process according to the invention may if desired be treated with a lower aliphatic alcohol to crystallize the salt of ATP disodium having a high purity and low toxicity.

Detailed description

Detailed procedure and preferred features for each step of the process according to the present invention will now be described.

*1st step.*—An aqueous solution containing ATP together with various other nucleotides as well as inorganic and organic substances as impurities is passed through for example a resin column packed with a strongly basic anion exchange resin in the salt form, such as a polystyrene quarternary ammonium type strongly basic anion exchange resin, to adsorb the nucleotides with the resin. The resin is then eluted stepwise with fractions of an eluant having increasing acid concentration and ion strength to obtain fractions mainly containing ATP. The elution is preferably effected wiht an aqueous acid solution (e.g. aqueous hydrochloric acid) which contains a soluble salt (e.g. sodium chloride).

The principal purpose of this step is to separate the ATP from various other nucleotides.

*2nd step.*—The ATP solution obtained in the first step is treated with a weakly basic anion exchange resin having primary, secondary and/or tertiary amine groups and in the salt form to adsorb selectively the ATP. The adsorbed ATP is then eluted with a dilute alkaline solution. This step is based on the discovery that a weakly basic anion exchange resin can adsorb well a large amounts of ATP even when large amounts of various neutral salts are present in the solution to be treated. As to the weakly basic anion exchange resins suitable for the practice of the present invention, either polystyrene amine type resins having primary, secondary, and/or tertiary amine groups, or copolymers of phenol (or aromatic amine), aliphatic amine, and formaldehyde can be used. The copolymer type resins have a porous structure and are particularly advantageously used. This is apparently because the molecules of ATP are relatively large so that the adsorption of the ATP is largely influenced by the porous structures of the resin used.

Figure 1:
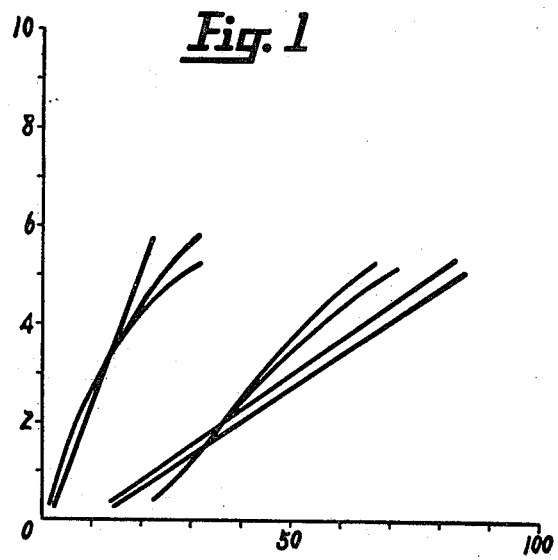
FIG. 1 illustrates the effectiveness of various types of resin in treating the effluent of step 1 during step 2 of the present invention.

With reference to the accompanying drawings, FIG. 1 shows the results obtained by various experiments using an aqueous solution which contains 6.26 mg./ml. of anhydrous free ATP, sodium chloride and hydrochloric acid and which has an adjusted pH of 5.0. The solution was passed through resin columns respectively packed with 10 ml. of the OH, Cl and acetate forms of various weakly basic anion exchange resins. From FIG. 1, it is apparent that the salt from resins such as the Cl form or acetate form have superior selectivity for the adsorption of the ATP to that of the OH form resins. FIG. 1 further shows that porous weakly basic anion exchange resins having an active phenol-aliphatic amine group, which are copolymers of phenol (or aromatic amine), aliphatic amine, and formaldehyde, such as for example Duolite A–2 and Duolite A–7 (trade names of the weakly basic anion exchange resin of the Cl and acetate forms respectively available from Chemical Process Company, U.S.A.) are particularly suitable for this purpose. It is furthermore found that the preferred pH range of the ATP solution to be treated with the resin is 1.5–3.0 and that good results can be achieved by the use of the sulphate and formate forms of similar resins.

With regard to the operation of this step, it is preferred to connect two or more resin columns in series relationship whereby the ATP solution after passing through one column is fed to a second column and so on when more than two columns are used. This enables one to adsorb a larger amount of ATP per unit volume of the resin with better adsorption efficiency and without leakage loss of ATP. The leakage of ATP can be observed before the saturation of the resin column with the ATP if only a single column is used for this step. When the first column is almost saturated with the ATP, it can be removed from the system, another column (regenerated previously) can be connected at the end of the system, and the ATP solution fed directly into the second column. By repetition of the aforementioned procedures, it is possible to adsorb the largest possible amount of ATP per unit volume of the resin used. The resin column is removed from the system after the adsorption of ATP and is treated with a dilute alkaline solution (for example, a dilute caustic soda solution for obtaining the ATP disodium salt) to obtain the eluated ATP almost quantitatively. In order to achieve a high concentration of ATP in the eluate, it is preferred to use an aqueous alkaline solution having a concentration of from 0.5–1.0 N. The principal purpose of this step is the concentration of the ATP in good yield as well as the removal of residual impurities including substances which have a degree of toxicity.

*3rd step.*—The ATP concentrate obtained from the second step still contains undesirable impurities such as coloring matter and also possibly toxic substances. The impurities may be removed in the third step. The ATP concentrate is first adjusted to a pH of 1.0–4.0 and is passed through a resin column packed with a non-ion exchange decolorizing resin to adsorb such impurities without undue loss of the ATP treated. The ATP remains in the effluent.

Non-ion exchange resins particularly useful for this purpose are those having a porous structure and having both phenolic hydroxy and anilinic amine groups as active groups in their molecules. These resins can be prepared in general for example by the condensation of phenol, resorcin, methaphenylene diamine, etc. with formaldehyde and are exemplified by Duolite #S–30 and Zentranol #W–291 (trade names of non-ionic decolorizing exchange resins available from Chemical Process & Company, U.S.A. and Chemurgisch & Company, Netherlands, respectively).

The resin may be activated by washing with a suitable mineral acid solution and is desirably again washed with water before use. The ATP solution is adjusted to a pH of 1.0–5.0 and is passed down through the resin. It is preferable to use an ATP solution having a lower pH to inhibit the leakage of coloring matter, while too acid a pH for the ATP solution can give rise to disadvantages such as instability of the ATP to be treated. The preferred range for the pH is from 2.0–4.0. ATP is recovered in the effluent, not being adsorbed in any substantial quantity on the resin. The remaining solution in the resin column can be forced out from the resin with water acidified to a pH of 1.0–5.0; by this method ATP can be recovered in the effluent almost quantitatively. After the adsorption of coloring matter and various other impurities, the resin is washed with a dilute alkaline solution such as e.g. aqueous ammonia or caustic soda solution to elute the adsorbed impurities, and is then washed with water. The resin can afterwards be reactivated with a suitable mineral acid solution to obtain the regenerated resin and can then be re-used. The principal purpose of this step is to remove the coloring matter and toxic impurities without any undue loss of ATP.

The aqueous ATP-disodium solution obtained has a high purity, and ATP-disodium crystals can be obtained therefrom by the addition of organic solvents such as e.g. methanol, ethanol and other lower aliphatic alcohols with stirring.

The following examples illustrate the invention:

EXAMPLE 1

120 liters of a fermented broth from the cultivation of *Brevibacterium ammoniagenes* (ATCC 6872) (content 4.5 mg./ml. ATP; 1.2 mg./ml. ADP (adenosine diphosphate); 0.4 mg./ml. AMP (adenylic acid) etc.) were passed downwardly through a resin column packed with 120 liters of a basic anion exchange resin of the polystyrene quaternary ammonium type (Diaion #SA–21A the trade name for a resin available from Mitsubishi Kasei Kogyo K.K., Tokyo, Japan) in its Cl form at a flow rate of 40 liters per hour. The resin was washed with water and was then washed with a 0.54 aqueous ammonium chloride solution to adjust the pH of the effluent to 7.0. 140 liters of 0.02 N HCl/0.29% NaCl aqueous solution, 80 liters of 0.02 N HCl/0.59% NaCl aqueous solution; and 60 liters of 0.05 N HCl/0.29% NaCl aqueous solution were then passed consecutively down through the resin column as eluting solutions to collect a final ATP fraction of 60 liters containing 8.2 mg./ml. of ATP, having a pH of 1.4, and containing no trace of ADP and AMP.

The ATP fraction was next adjusted to a pH of 3.0 with 10 N aqueous caustic soda solution and was passed down through 3 resin columns connected together in series each of which was packed with one liter of Duolite #A–7 (the trade name of a weakly basic anion exchange resin available from Chemical Process & Company, U.S.A.) in the Cl form at a flow rate of 4 liters per hour. After 30 liters of the solution had been passed through the system, a new regenerated resin column was connected to the system in series relationship as the 4th column. One liter of water was fed into the first column to force the remaining ATP solution into the following columns. The first column was then disconnected from the system.

15 liters of the ATP fraction were then fed into the system comprising the second to fourth columns, following which a new regenerated resin column was connected to the system as the 5th column in series relationship. The second column was freed of ATP solution in a similar manner to that described above in relation to the first column and was disconnected from the system. After 15 liters of the ATP fractions were passed down through the system comprising the 3rd to 5th columns, the 3rd column was treated and removed from the system in an analogous manner.

The three removed columns were each eluted with 1 N aqueous NaOH at a flow rate of 2 liters per hour, each column yielding 3 liters of the ATP fraction. The combined fractions (9 liters) had a concentration of ATP of 44.0 mg./ml. and were next adjusted to a pH of 3.0 by the addition of 6 N aqueous HCl. The solution obtained was coloured and had an optical density of 1.8 at 420 m$\mu$. The eluate was passed down through a resin column (diameter 8 cm.) packed with 2 liters of Duolite #S–30 (the trade name of a non-ion exchange decolorizing resin available from Chemical Process & Company, U.S.A.) at a flow rate of 3 liters per hour. The initial fraction of one liter was discarded and another fraction containing ATP was collected. Following this, 2 liters of water having an adjusted pH of 3.0 was fed into the system to force out the remaining solution from the column. 10 liters of combined effluent were obtained having an ATP concentration of 38.4 mg./ml., a pH of 3.0 and an optical density of 0.08 at 420 m$\mu$.

30 liters of methyl alcohol were added with mild stirring to separate crystalline ATP-disodium, which was then redissolved in 4 liters of water. 4 liters of 96% aqueous ethanol were then added slowly with mild stirring to precipitate crystalline ATP-disodium. The crystalline material obtained was separated by filtration and freeze-dried for about 8 hours to yield 374 grams of white crystalline ATP-disodium powder having a purity of 98.2%.

Figure 2:
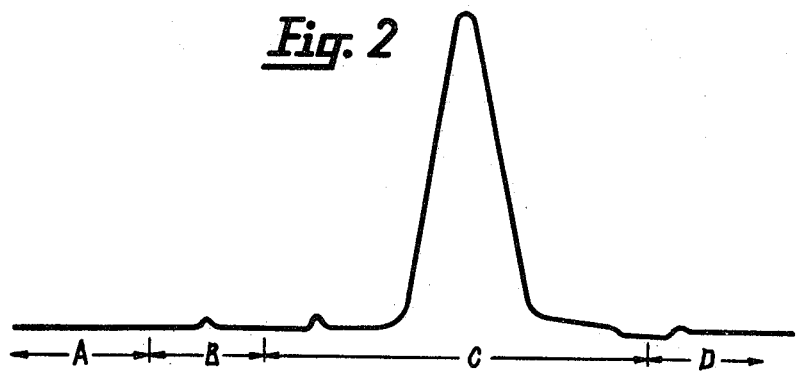
FIGS. 2 and 3, respectively, depict chromatograms of ATP-disodium salt prepared in accordance with the present invention and by conventional techniques.
Figure 3:
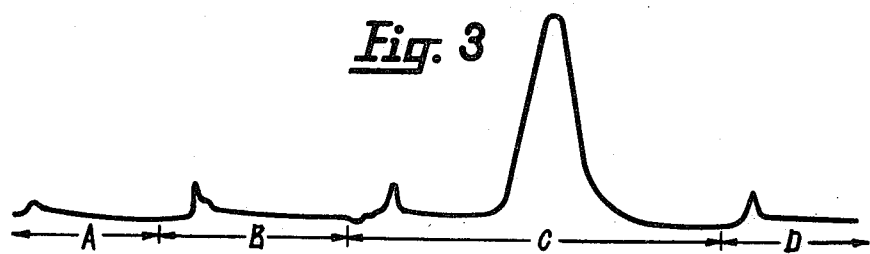

A chromatogram of the ATP-disodium salt obtained was prepared by ion exchange chromatography using a strongly basic anion exchange resin Dowex 1×2. This chromatogram was compared with that of a conventional ATP-disodium salt of ordinary commercial grade. FIG. 2 of the accompanying drawings is the chromatogram of ATP-disodium purified by the process of the present invention. FIG. 3 of the accompanying drawings is the chromatogram of an ordinary commercial grade of ATP-disodium. The ATP-disodium salt purified according to the invention was substantially free from any substance affecting the ultra-violet absorption.

The results obtained from various animal tests with regard to the $LD_{50}$ and "shock dose" valves of the ATP-disodium are shown in Table 1 which follows Example 2. From this table it is apparent that the ATP-disodium salt according to the present example has far lower toxicity than known commercial grades of ATP-disodium.

Various $LD_{50}$ valves were detected at the end of each step during the purification procedure according to Example 1 and are shown in Table 2 which follows Example 2. These figures show that the substance responsible for toxicity are removed in particular by the second and third steps of the process according to the invention.

EXAMPLE 2

Adenosine monophosphate (designated as AMP) was extracted and purified in conventional manner whereby cells of the yeast and other micro-organisms were hydrolized to obtain RNA which was extracted and further hydrolized to AMP. ATP was synthetically prepared from AMP by the addition of morphorodine-diphosphate again in conventional manner.

500 grams of the ATP obtained was dissolved in 50 liters of water and the pH of the solution was adjusted to 12.0 by adding caustic soda. The alkaline solution was passed downwardly through a resin column packed with 20 liters of a basic anion exchange resin of the polystyrene quarternary ammonium type Diaion #SA–21A (the trade name for a resin available from Mitsubishi Kogyo K.K., Tokyo, Japan) in its Cl form at a flow rate of 40 liters per hour. The resin was washed with water. 140 liters of 0.02 N HCl/0.29% NaCl aqueous solution; and 60 liters of 0.05 N HCl/0.29% NaCl aqueous solution; and 60 liters of 0.5 N HCl/0.29% NaCl aqueous solution were then passed consecutively down through the resin column as eluting solutions to collect a final ATP fraction in an amount of 60 liters containing 8.0 m.g./m.l. of ATP The ATP fraction was next adjusted to a pH of 3.0 with 10 N aqueous caustic soda solution and was passed down through 3 resin columns connected together in series, each of which was packed with one liter of Duolite # A–2 (the trade name of a weakly basic anion exchange resin available from Chemical Process & Company, U.S.A.) in its acetate form at a flow rate of 4 liters per hour. ATP was adsorbed onto the resin in a similar manner to that described in Example 1. Three resin columns were washed with water and were further washed with 0.5 N caustic soda solution at the flow rate of 3 liters per hour to obtain 4.5 liters of an ATP fraction from each column. The combined fractions of ATP from 3 columns had a concentration of 45.3 mg./ml. Treatment with the non-ion exchange resin Duolite #S–30, crystallization with methanol, and recrystallization with ethanol were carried out in a similar manner to that described in Example 1 to yield 383 grams of white crystalline powder of ATP-disodium salt having a purity of 97.4% as anhydrous ATP salt.

Various animal tests were carried out in an analogous manner to that described in Example 1 and indicated a $LD_{50}$ value of 390 mg/ml. and the intermediate "shock dose" values shown in the following Table 1 (for guinea pigs).

ATP purified according to the present invention has lower toxicity than the present commercial grades of ATP as illustrated in Table 1 and 2. In Table 1, the toxicity of the ATP according to the present invention is compared with that of known grades of ATP. In Table 2 ATP obtained from each step described in Example 1 below was tested to obtain $LD_{50}$ values using pure live mice belonging to A/Jax, and "shock dose" values using guinea pigs. In these tests, ATP was administered intraveneously. The two tables illustrate that the toxicity of the ATP according to the present invention is very significantly lower than that of the present commercial grades of ATP.

TABLE 1.—COMPARISON OF ATP-DISODIUM PREPARED ACCORDING TO THE PRESENT INVENTION WITH A COMMERCIAL GRADE OF ATP-DISODIUM

| ATP-disodium | $LD_{50}$ I.V., mg./kg. | Dose [1] (mg./kg.) | | | |
|---|---|---|---|---|---|
| | | 40 | 20 | 10 | 5 |
| Ordinary commercial grade in Japan | 250 | +++ | ++ | + | ± |
| Standard commercial grade in U.S.A | 251 | +++ | ++ | + | ± |
| Prepared according to Example 1 | 510 | ++ | + | − | − |
| Prepared according to Example 2 | 390 | ++ | + | ± | − |

[1] + and − indicate states of shock.

TABLE 2

$LD_{50}$ values of ATP obtained from different steps according to the process of Example 1

$LD_{50}$ i.v. mg./kg.

Material tested:
    ATP fraction from the strongly basic anion exchange resin _____ 140
    ATP from the eluate of Duolite #A–7 _____ 230
    ATP from the effluent of Duolite #S–30 _____ 480
    ATP-disodium salt, recrystallized _____ 510

What is claimed is:

1. A process for purifying Adenosine triphosphate (ATP) contained in an aqueous solution containing other nucleotides as impurity, which comprises the steps of: (1) adsorbing ATP on to a strongly basic anion exchange resin followed by elution with an aqueous acid solution; (2) adsorbing the eluted ATP on to a weakly basic anion exchange resin followed by elution with a dilute aqueous alkaline solution; and (3) contacting the ATP fraction recovered from step (2) with a non-ion exchange decolorizing resin so as to adsorb coloring matter thereon, while recovering a solution containing purified ATP therefrom.

2. A process according to claim 1 wherein the ATP is eluted from the strongly basic anion exchange resin of step (1) with an aqueous acid solution which also contains a soluble salt.

3. A process according to claim 2 in which the aqueous acid solution comprises aqueous hydrochloric acid having sodium chloride dissolved therein.

4. A process according to claim 1 wherein the elution in step (1) is effected with fractions of aqueous acid solution containing increasing concentrations of acid.

5. A process according to claim 1 wherein the strongly basic anion exchange resin used in step (1) is a resin of the polystyrene quarternary ammonium type.

6. A process according to claim 1 wherein the pH of the aqueous acid solution obtained from step (1) is adjusted to from 1.5 to 3.0 prior to step (2).

7. A process according to claim 1, wherein the step (2) the weakly basic anion exchange resin used is in salt form.

8. A process according to claim 7 in which the said resin is in salt form selected from the group consisting of chloride, acetate, sulfate and formate salts.

9. A process according to claim 1 wherein in step (2) the weakly basic anion exchange resin is a resin of the phenol-aliphatic amine type.

10. A process according to claim 1 wherein in step (2) the weakly basic anion exchange resin is a porous resin.

11. A process according to claim 1 wherein in step (2) the elution is effected with aqueous sodium hydroxide.

12. A process according to claim 1 wherein the pH of the solution of ATP obtained from step (2) is adjusted to pH 1.0 to 5.0 prior to step (3).

13. A process according to claim 1 wherein the decolorizing resin used in step (3) is a resin containing both hydroxy and aniline groups.

14. A process according to claim 1 wherein in step (2) the elution is effected with an aqueous 0.5 to 1.0 N dilute alkaline solution.

15. A process according to claim 1 wherein after step (3) the solution of ATP is treated with a lower aliphatic alcohol to precipitate ATP.

16. A process according to claim 1 wherein in step (2) a plurality of columns containing the weakly basic anion exchange resin are used connected in series whereby ATP solution having passed through a first column is next passed through a second column.

17. A process for purifying ATP contained in an aqueous solution containing other nucleotides as impurity, which comprises the steps of: (1) adsorbing ATP on to a strongly basic anion exchange resin followed by elution with an aqueous acid solution; (2) adsorbing the eluted ATP on to a porous weakly basic anion exchange resin followed by elution with a dilute aqueous alkaline solution, adjusting the pH of the eluted ATP fraction to a pH of 1.0 to 5.0, and (3) contacting the ATP fraction recovered from step (2) with a non-ion exchange decolorizing resin so as to adsorb coloring matter thereon, while recovering a solution containing purified ATP therefrom.

18. The process of claim 17 wherein said resin employed in step (2) is a resin of the phenol-aliphatic amine type.

19. The process of claim 17 wherein
    (a) the pH of the eluted fraction from step (1) is first adjusted to pH 1.5 to 3.0 prior to passing through step (2) and
    (b) the resin used in step (2) is the salt form of a phenol-aliphatic amine type resin.

References Cited

UNITED STATES PATENTS

| 2,671,059 | 3/1954 | Smit | 260—2.1 |
| 2,700,038 | 1/1955 | Lipton et al. | 260—211.5 |
| 3,157,635 | 11/1964 | Tanaka et al. | 260—211.5 |
| 3,157,637 | 11/1964 | Khym | 260—211.5 |
| 3,271,386 | 9/1966 | Huang | 260—211.5 |
| 3,278,517 | 10/1966 | Marumo et al. | 260—211.5 |

LEWIS GOTTS, Primary Examiner

J. R. BROWN, Assistant Examiner

U.S. Cl. X.R.

424—180